ANDREW SCHMITT, OF CALIFORNIA, MISSOURI.

Letters Patent No. 84,770, dated December 8, 1868.

IMPROVED SALVE FOR BURNS AND SCALDS.

The Schedule referred to in these Letters Patent and making part of the same.

*To all whom it may concern:*

Be it known that I, ANDREW SCHMITT, of California, in the county of Moniteau, and State of Missouri, have made certain new and useful Improvements in Salve for Burns and Scalds; and I do hereby declare that the following is a full and clear description thereof.

This salve is composed of fish-oil and cotton or linen lint, prepared as hereinafter described, and applied directly to the burn or scald.

To enable those skilled in the art to make and use my improved salve, I will proceed to describe its construction and the mode of its appliance.

I take, of thoroughly-disintegrated lint, linen preferred, one-half (½) pound, and of best fish-oil, one (1) quart, and thoroughly mix them, then char or burn them together for, say, twenty (20) minutes, after which cool off the compound thus prepared, and can for use.

The salve thus prepared may be applied directly to the burn or scald, and repeatedly renewed until the wound shall have healed, which will very speedily occur.

Having described my invention,

What I claim, is—

The formation of a salve for the cure of burns, &c., in the manner and of the materials herein described.

In testimony of which invention, I hereunto set my hand, in presence of—

AND. SCHMITT.

Witnesses:
 M. RANDOLPH,
 GEORGE W. HERBERT.